No. 703,317. Patented June 24, 1902.
L. STEVENSON.
POTATO DIGGER.
(Application filed Mar. 31, 1902.)
(No Model.)
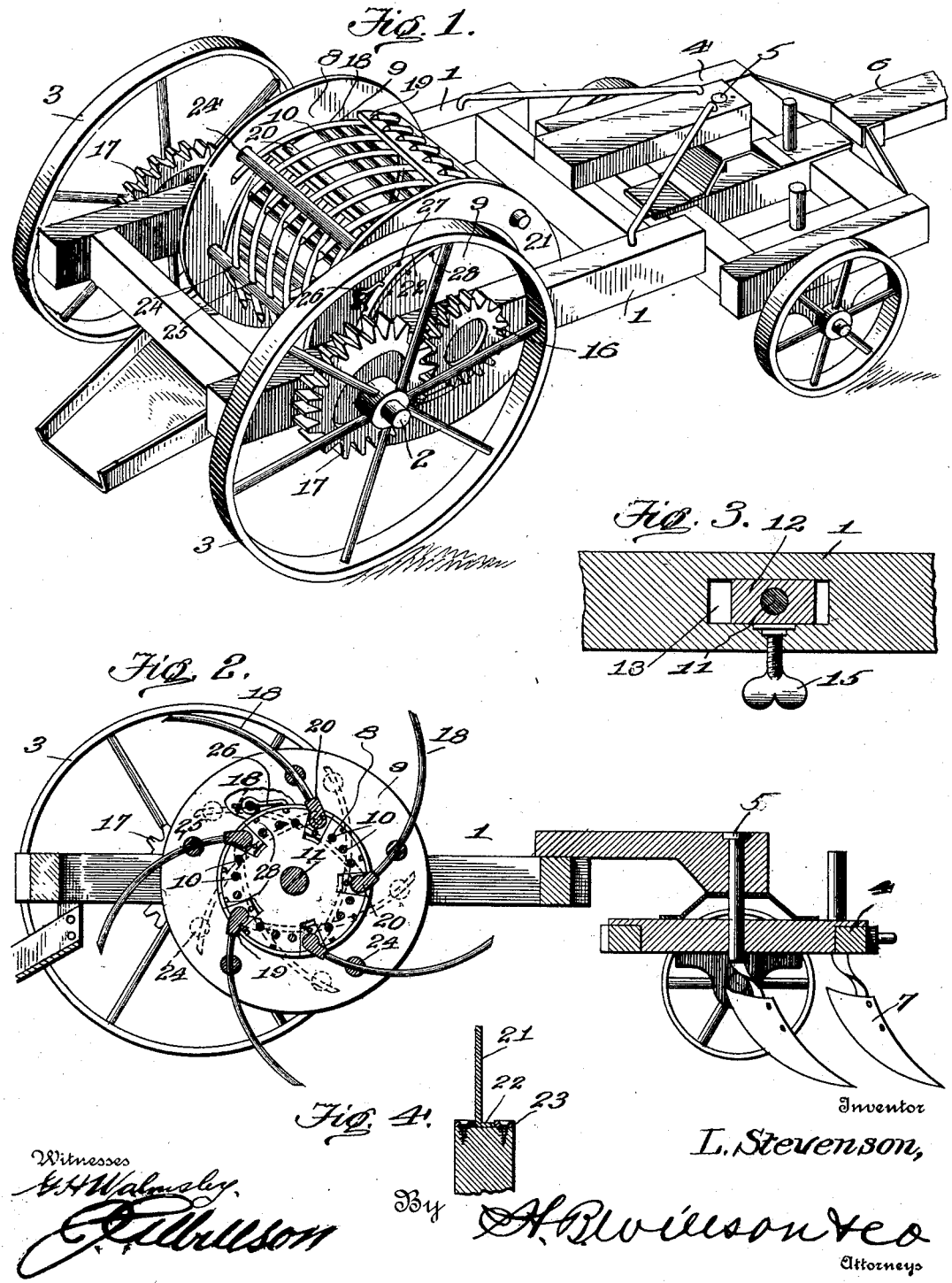

UNITED STATES PATENT OFFICE.

LEONARD STEVENSON, OF MAPLETON, MICHIGAN.

POTATO-DIGGER.

SPECIFICATION forming part of Letters Patent No. 703,317, dated June 24, 1902.

Application filed March 31, 1902. Serial No. 100,778. (No model.)

*To all whom it may concern:*

Be it known that I, LEONARD STEVENSON, a citizen of the United States, residing at Mapleton, in the county of Grand Traverse and State of Michigan, have invented certain new and useful Improvements in Potato-Diggers; and I do declare the following to be a full, clear, and exact description of the invention, such as will enable others skilled in the art to which it appertains to make and use the same.

The invention relates to potato-diggers.

The object of the invention is to provide a machine of this character which shall be simple of construction, durable in use, comparatively inexpensive of production, and one which will perform its work in an efficient manner.

With this and other objects in view the invention consists of certain novel features of construction, combination, and arrangement of parts, which will be hereinafter more fully described, and particularly pointed out in the appended claims.

Figure 1 is a perspective view of my improved potato-digger. Fig. 2 is a longitudinal vertical sectional view showing in full lines the digging-forks in operative position and in dotted lines in closed position. Fig. 3 is a longitudinal sectional view through a portion of one of the side pieces of the frame, illustrating the adjustable bearing-block for the cylinder; and Fig. 4 is a sectional view through a fragment of the rim-flange of a head of the cylinder.

Referring to the drawings, 1 denotes the main frame, provided with stud-axles 2, upon which are journaled the drive-wheels 3, and 4 denotes the front truck-frame, connected to the front of the main frame by a king-bolt 5 and provided with a draft-tongue 6 and plows or shovels 7.

8 denotes what I shall for convenience of reference term an "open-work" drum, consisting of heads 9 and parallel spaced-apart rods 10. This drum is provided with an axle 11, which is journaled in longitudinally-adjustable blocks 12, mounted in slots 13, formed in the side pieces of the main frame and held in place by set-screws 15. The shafts of this drum are provided with fixed pinions 16, which mesh with corresponding gears 17, fixed to the drive-wheels. By adjusting the blocks 12 in the slots 13 the pinion of the drum may be moved into or out of engagement with the gears of the drive-wheel.

18 denotes curved forks, the heads 19 of which are provided with trunnions 20, which are pivoted in an annular row to the heads of the cylinder or drum.

21 denotes rims which have laterally-projecting annular flanges 22, that embrace and have a sliding engagement upon the periphery of the heads of the cylinder between annular rings or bands 23, secured by screws or other means to the peripheries of the heads. Extending transversely across the cylinder and journaled in the rims are rods 24, through each of which extends one or more tines of each fork. As illustrated, each rod is provided with holes 25, corresponding in number to the tines of each fork. By turning or sliding the rims upon the peripheries of the heads of the cylinder the forks may be drawn from the position shown in full lines in Fig. 2 to the position shown in dotted lines in said figure or close to the axis of the drum and within the circumference of the rims, so that the machine may be transported from one place to another without exposing the forks to the danger incident to coming in contact with obstructions in the road and other places. Any means may be employed for holding the rims in adjustment—as, for instance, the rims may be provided with spring-catches 26, which work through holes 27, formed in the flanges, and engage notches 28, formed in the periphery of the cylinder-heads.

Any means may be employed for vertically adjusting the plows or shovels to raise them from contact with the ground or to vary their depth of penetration in the ground; but as this means forms no part of the present invention it is deemed unnecessary to describe the same.

In operation as the machine is drawn along the plows or shovels will dig up the potatoes, and the forks which follow immediately in the rear will lift the potatoes up, shake the dirt therefrom, and as each fork reaches its highest point of rotation the potatoes in the soil not previously loosened will fall upon the grated or open-work cylinder and the soil be broken and allowed to fall through said cylinder, and as the cylinder continues to rotate the potatoes separated from the soil will be discharged at the rear of the machine.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. In a potato-digger, the combination with the main frame, of a rotary open-work cylinder mounted thereon, and forks radially adjustably connected to said cylinder and adapted to lift the potatoes from the ground and permit them to drop upon said cylinder and loosen and separate the soil from the potatoes, substantially as set forth.

2. In a potato-digger, the combination with a wheel-supported frame, of a rotary cylinder mounted thereon, means for rotating said cylinder, forks arranged annularly about said cylinder, rims rotatably mounted upon the heads of said cylinder, bars connecting said heads and slidably connected with the tines of said forks whereby said forks may be adjusted radially with respect to said cylinder, substantially as set forth.

3. In a potato-digger, the combination with a rotary open-work cylinder, of rims mounted for radial adjustment upon the heads of said cylinder, forks pivoted in the heads of said cylinder, bars extending across said cylinder and pivoted in said rims and provided with holes through which the tines of the forks project, and means for locking the rims in adjustment, substantially as set forth.

In testimony whereof I have hereunto set my hand in presence of two subscribing witnesses.

LEONARD STEVENSON.

Witnesses:
E. O. LADD,
LIZZIE L. LADD.